US009516651B2

(12) United States Patent
Boström et al.

(10) Patent No.: US 9,516,651 B2
(45) Date of Patent: Dec. 6, 2016

(54) HANDLING BAND COMBINATIONS WITH REDUCED PERFORMANCE IN CARRIER AGGREGATION

(71) Applicant: Telefonaktiebolaget L M Ericsson (publ), Stockholm (SE)

(72) Inventors: Lisa Boström, Solna (SE); Magnus Larsson, Sollentuna (SE); Christian Skärby, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 558 days.

(21) Appl. No.: 13/880,396

(22) PCT Filed: Mar. 21, 2013

(86) PCT No.: PCT/SE2013/050313
§ 371 (c)(1),
(2) Date: Apr. 19, 2013

(87) PCT Pub. No.: WO2013/147680
PCT Pub. Date: Oct. 3, 2013

(65) Prior Publication Data
US 2014/0092825 A1    Apr. 3, 2014

Related U.S. Application Data

(60) Provisional application No. 61/615,467, filed on Mar. 26, 2012.

(51) Int. Cl.
*H04W 4/00* (2009.01)
*H04W 72/04* (2009.01)
*H04L 5/00* (2006.01)

(52) U.S. Cl.
CPC ............ *H04W 72/048* (2013.01); *H04L 5/001* (2013.01); *H04L 5/0044* (2013.01); *H04L 5/0092* (2013.01)

(58) Field of Classification Search
CPC ........................ H04W 52/281; H04W 72/048
See application file for complete search history.

(56) References Cited

U.S. PATENT DOCUMENTS 9,220,103 B2 *  12/2015  Fu ..................... H04W 72/0453
2007/0019575 A1 *  1/2007  Shaheen ...................... 370/310
(Continued)

FOREIGN PATENT DOCUMENTS

GB          2500582 A    10/2013
WO       2011024646 A1    3/2011
(Continued)

OTHER PUBLICATIONS

3rd Generation Partnership Project. 3GPP TS 36.321 V10.5.0 (Mar. 2012). 3rd Generation Partnership Project; Technical Specification Group Radio Access Network; Evolved Universal Terrestrial Radio Access (E-UTRA); Medium Access Control (MAC) protocol specification (Release 10). Mar. 2012, pp. 1-54.
(Continued)

*Primary Examiner* — Guang Li
(74) *Attorney, Agent, or Firm* — Murphy, Bilak & Homiller, PLLC

(57) ABSTRACT

Techniques are disclosed for identifying carrier-aggregation band combinations that may be supported by a mobile terminal with limited performance. According to one example method, a mobile terminal sends (710) a band capability information element to the network (e.g., to a 3GPP eNB). The band capability information element contains data indicating which band combinations the mobile terminal supports for carrier aggregation. In addition, the mobile terminal sends (720) additional information (e.g., one or more new parameters) associated with at least one specific band combination. In some cases, this new information indicates that a specific band combination has limited support. In these or in other embodiments, the new
(Continued)

information contains information about an amount or type of limitation. This latter information may be present on its own, or in combination with the information that more generally indicates that the mobile terminal is capable of only limited support for a specific band combination.

5 Claims, 5 Drawing Sheets

(56) References Cited

U.S. PATENT DOCUMENTS

| | | | |
|---|---|---|---|
| 2007/0275722 A1* | 11/2007 | Thorson et al. | 455/436 |
| 2010/0150007 A1* | 6/2010 | Jung et al. | 370/252 |
| 2010/0159919 A1* | 6/2010 | Wu | 455/424 |
| 2010/0220674 A1* | 9/2010 | Fu | H04L 5/0007 370/329 |
| 2010/0272051 A1* | 10/2010 | Fu | H04L 5/0037 370/329 |
| 2011/0103243 A1* | 5/2011 | Larsson | H04L 5/001 370/252 |
| 2011/0134774 A1* | 6/2011 | Pelletier | H04W 52/365 370/252 |
| 2011/0243083 A1* | 10/2011 | Zhang | H04W 8/22 370/329 |
| 2011/0319069 A1* | 12/2011 | Li | H04W 8/22 455/422.1 |
| 2012/0113866 A1* | 5/2012 | Tenny | H04W 24/10 370/254 |
| 2012/0170526 A1* | 7/2012 | Wei | H04L 5/001 370/329 |
| 2012/0184281 A1* | 7/2012 | Kim | H04W 28/048 455/450 |
| 2012/0213096 A1 | 8/2012 | Krishnamurthy et al. | |
| 2013/0053044 A1* | 2/2013 | Davies et al. | 455/438 |
| 2013/0137475 A1* | 5/2013 | Rousu et al. | 455/509 |
| 2013/0142139 A1* | 6/2013 | Kitazoe | H04W 28/20 370/329 |
| 2013/0142164 A1* | 6/2013 | Shi et al. | 370/329 |
| 2013/0252603 A1* | 9/2013 | Immonen et al. | 455/422.1 |
| 2014/0219170 A1* | 8/2014 | Zhao | H04W 8/24 370/328 |

FOREIGN PATENT DOCUMENTS

| | | |
|---|---|---|
| WO | 2011052447 A1 | 5/2011 |
| WO | 2011131014 A1 | 10/2011 |
| WO | WO 2012022050 A1 * | 2/2012 |

OTHER PUBLICATIONS

3rd Generation Partnership Project. 3GPP TS 36.331 V9.10.0 (Mar. 2012). 3rd Generation Partnership Project; Technical Specification Group Radio Access Network; Evolved Universal Terrestrial Radio Access (E-UTRA); Radio Resource Control (RRC); Protocol specification (Release 9). Mar. 2012, pp. 1-255.

3rd Generation Partnership Project. 3GPP TS 36.331 V10.5.0 (Mar. 2012). 3rd Generation Partnership Project; Technical Specification Group Radio Access Network; Evolved Universal Terrestrial Radio Access (E-UTRA); Radio Resource Control (RRC); Protocol specification (Release 10). Mar. 2012, pp. 1-302.

Unknown, Author. "Carrier Aggregation Bandwidth Combination." Qualcomm Incorporated. 3GPP TSG-RAN WG4 #62. R4-120667. Dresden, Germany. Feb. 6-10, 2012. 1-4.

Unknown, Author, "Methods for WLAN/Bluetooth in-device coexistence interference avoidance", Ericsson, ST-Ericsson, 3GPP TSG-RAN WG2 #70bis, Tdoc R2-103900, Stockholm, Sweden, Jun. 28-Jul. 2, 2010, 1-3.

* cited by examiner

```
BandParameters-r10 ::= SEQUENCE {
    bandEUTRA-r10           INTEGER (1..64),
    bandParametersUL-r10    BandParametersUL-r10    OPTIONAL,
    bandParametersDL-r10    BandParametersDL-r10    OPTIONAL,
    limitedSupport-r10      INTEGER (0..63)         OPTIONAL
}
```

HANDLING BAND COMBINATIONS WITH REDUCED PERFORMANCE IN CARRIER AGGREGATION

RELATED APPLICATIONS

This application claims the benefit of and priority to U.S. Provisional Application Ser. No. 61/615,467, filed 26 Mar. 2012. The entire contents of said U.S. Provisional Application are incorporated herein by reference.

TECHNICAL FIELD

The present disclosure generally relates to carrier aggregation in a wireless communication system, and more particularly relates to techniques for configuring mobile terminals with suitable band combinations for carrier aggregation.

BACKGROUND

Carrier aggregation is a feature recently developed by the members of the 3rd-Generation Partnership Project (3GPP) for so-called Long Term Evolution (LTE) systems, and is standardized as part of LTE Release 10, which is also known as LTE-Advanced. An earlier version of the LTE standards, LTE Release 8, supports radio link bandwidths up to 20 MHz. In LTE-Advanced, bandwidths up to 100 MHz are supported. The very high data rates contemplated for LTE-Advanced will require this expansion of the transmission bandwidth.

In order to maintain backward compatibility with LTE Release 8 user terminals, the spectrum available for use by systems and mobile terminals compatible with the LTE-Advanced standards is divided into Release 8-compatible chunks called component carriers. LTE-Advanced mobile terminals (referred to as "user equipment" or "UEs" in 3GPP documentation) and systems can "aggregate" two or more of these component carriers to achieve higher bandwidth and higher data-rate transmissions than are possible in an LTE Release 8 system.

This approach, called "carrier aggregation," thus enables bandwidth expansion beyond the limits of LTE Release 8 systems by allowing user terminals to transmit data over multiple component carriers that together can cover up to 100 MHz of spectrum. This is shown in FIG. 1, which illustrates the aggregation of five 20-MHz bands Importantly, the carrier aggregation approach ensures compatibility with earlier Release 8 terminals, each of which may simultaneously use one of the five 20-MHz bands, while also ensuring efficient use of a wide carrier by making it possible for legacy terminals to be scheduled in all parts of the wideband LTE-Advanced carrier.

Release 10 of the LTE standards supports up to five aggregated carriers, where each carrier is limited to one of six radio frequency (RF) bandwidths, corresponding to 6, 15, 25, 50, 75 or 100 LTE resource blocks. The respective RF bandwidths are 1.4, 3, 5, 10, 15, and 20 MHz. Carrier aggregation is called intra band if the carriers all belong to the same 3GPP operating band. The carriers in the same band may be contiguous, as shown in FIG. 2, or non-contiguous, as shown in FIG. 3. Inter-band carrier aggregation is the case when there is at least one carrier in a different 3GPP operating band. This is shown in FIG. 4.

The number of aggregated component carriers, as well as the bandwidth of the individual component carrier, may be different for uplink (UL) and downlink (DL) transmissions. A symmetric configuration refers to the case where the number of component carriers in downlink and uplink is the same. An asymmetric configuration refers to the case where the number of component carriers is different. However, an asymmetric configuration where the number of uplink component carriers is higher than the number of downlink component carriers is not allowed under the Release 10 specifications.

The number of component carriers configured for a geographic cell area may be different from the number of component carriers actually "seen" (or used) by a given terminal. A user terminal, for example, may support more downlink component carriers than uplink component carriers, even though the same number of uplink and downlink component carriers may be actually offered by the network in a particular area.

From a network deployment perspective, during the timeframe in which Release 10 equipment is deployed, all cells are expected to be compatible with Releases 8 and 9 of the LTE specifications. During initial access, a LTE Release 10 terminal behaves in the same way as a LTE Release 8/9 terminal, and accesses a single cell using a single uplink carrier and single downlink carrier. The serving cell in which the UE end up at initial access is referred to as the UE's Primary Cell (PCell). After successful connection to the network a terminal may—depending on its own capabilities and the network—be configured with additional component carriers in the UL and DL. Additional serving cells that are configured for the UE are referred to as Secondary Cells (SCell).

Configuration of SCells is performed using Radio Resource Control (RRC) signaling. Due to the heavy signaling and rather slow speed of RRC signaling, it is not desirable to frequently change the configured cells for a given mobile terminal. Accordingly, the specifications are designed to allow a terminal to be configured with multiple component carriers even though not all of them are currently used. Secondary cells may be activated and deactivated, using Medium Access Control (MAC) signaling, as needed. Thus, to make a downlink transmission on an configured SCell or to be able to provide the SCell with an uplink grant the serving base station (an evolved Node B or "eNB" in 3gPP terminology) must first activate the SCell by sending an activation/deactivation command (as a MAC CE) to the UE.

MAC signaling is much faster than RRC signaling, allowing rapid activation and deactivation of component carriers. When a terminal is activated on multiple SCells, this implies that it has to monitor all DL component carriers for PDCCH and PDSCH. This implies a wider receiver bandwidth, higher sampling rates, etc., resulting in high power consumption. While a component carrier is deactivated, related circuitry and/or procedures may be disabled, allowing the mobile terminal to reduce its power consumption.

Differences Between Primary and Secondary Cells when Using CA

As suggested above, the Primary cell (PCell) for an LTE-Advanced mobile terminal (UE) basically corresponds to the Release 8/9 "serving cell." The UE monitors system information only on the PCell, and also takes security and Network Access Stratum (NAS) mobility information from this cell. System information needed by the UE to properly use a SCell is provided to the UE via dedicated signaling.

An uplink SCell does not have any Physical Uplink Control Channel (PUCCH) of its own, but the UE may transmit hybrid-ARQ (HARQ) acknowledgements/negative-acknowledgements (A/N) and Channel State Information (CSI) for SCells on the PUCCH of the PCell. Crosscarrier scheduling, whereby the UE is allocated resources for an SCell via a Physical Downlink Control Channel (PD-CCH) of another serving cell used by the same UE, is not supported for the PCell. Semi-Persistent Scheduling (SPS) and Transmission Time Interval (TTI) bundling is supported only on the PCell. Likewise, the Radio Link Monitoring and Radio Link Failure functionalities specified for LTE apply only to the PCell.

Furthermore, the PCell for a given mobile terminal always consists of a DL carrier and an UL carrier linked to the primary DL carrier via a System Information Block Type 2 (SIB2), while an SCell may be consist of a DL carrier and a corresponding SIB2-linked UL carrier, or only a DL carrier. From eNB perspective, at least in the Release 10 time frame, all serving cells will still consist of a DL carrier and the SIB2-linked UL, even if some mobile terminals served by the eNB are configured with an SCell that consists of only a DL carrier.

The PCell for a given mobile terminal can be changed using handover (HO) procedures. During HO, all SCells configured for the mobile terminal being handed over are deactivated. The target eNB (which may be the same as the source eNB) then decides whether to use the same SCells, configure and activate a different set, or to simply deconfigure them.

From the mobile terminal perspective, the PCell is always activated, while SCells can be activated and deactivated on a need basis. Functionalities with respect to activated and deactivated SCells is described further in chapter 5.13 of the 3GPP document "Evolved Universal Terrestrial Radio Access (E-UTRA); Medium Access Control (MAC) protocol specification," 3GPP TS 36.321, v. 10.5.0 (March 2012), available at www.3gpp.org. As noted above, activation and deactivation of SCells is performed using a MAC Control Element (MAC CE), while configuration and deconfiguration of SCells is performed using RRC signaling.

A mobile terminal capable of carrier aggregation can have only one PCell and up to four SCells. The Cell Radio Network Terminal Identifier (C-RNTI) used by the mobile terminal (e.g., to scramble and de-scramble data at the physical layer) is UE-specific and the same C-RNTI is used both in the PCell and in the SCell(s).

UE Capability Signaling

Mobile terminals compliant with Releases 8 and 9 of the LTE standard are able to signal which bands they support, using a UE Capability Information Element (IE) specified in "Evolved Universal Terrestrial Radio Access (E-UTRA); Radio Resource Control (RRC); Protocol Specification," 3GPP TS 36.331, v. 9.10.0 (March 2012), available at www.3gpp.org. In the Release 10 version of the specifications (e.g., 3GPP TS 36.331, v. 10.5.0 (March 2012)), the content of this IE was extended when Carrier Aggregation was introduced, in order to allow the UE to indicate support for combinations of bands (i.e, to be able to indicate support for aggregation of serving cells from different or same bands). Note that a Release 10 UE is not required to support carrier aggregation, as it is an optional feature.

As part of the signaled band-combination the UE can also indicate, for a specific band combination, whether it supports only a DL Scell in a specific band. Support of UL-only SCells is not supported in the Release 10 timeframe. As part of the signaled band-combination, the UE also indicates which bandwidth class applies and whether MIMO is supported. The following is excerpted from 3GPP TS 36.331, v. 10.5.0 (March 2012):

```
BandParameters-r10 ::= SEQUENCE {
    bandEUTRA-r10         INTEGER (1..64),
    bandParametersUL-r10  BandParametersUL-r10  OPTIONAL,
    bandParametersDL-r10  BandParametersDL-r10  OPTIONAL
}
```

For example, for a UE which has RF transmitters capable of supporting both band 4 and band 17, but only supports CA when band 4 is the PCell, the configuration might look like this:

```
SupportedBandCombination-r10 {BandCombinationParameters-r10__1,
BandCombinationParameters-r10__2,
BandCombinationParameters-r10__3}
Where
BandCombinationParameters-r10__1 {BandParameters-r10__1__1,
BandParameters-r10__ 1__2}
BandCombinationParameters-r10__2 {BandParameters-r10__2__1}
BandCombinationParameters-r10__3 {BandParameters-r10__3__1}
Where
BandParameters-r10__1__1 {
bandEUTRA-r10 = 4
bandParametersUL-r10 = BandParametersUL-r10
bandParametersDL-r10 = BandParametersDL-r10
}
BandParameters-r10__1__2 {
bandEUTRA-r10 = 17
bandParametersUL-r10 = NOT PRESENT
bandParametersDL-r10 = BandParametersDL-r10
}
-> UE states that it supports having the PCell in B4 and the SCell with DL only in B17
BandParameters-r10__2__1 {
bandEUTRA-r10 = 4
bandParametersUL-r10 = BandParametersUL-r10
bandParametersDL-r10 = BandParametersDL-r10
}
-> UE states that it supports having the PCell in B4 and no SCell configured
BandParameters-r10__3__1 {
bandEUTRA-r10 = 17
bandParametersUL-r10 = BandParametersUL-r10
bandParametersDL-r10 = BandParametersDL-r10
}
-> UE states that it supports having the PCell in B17 and no SCell configured
```

Thus, with the current 3GPP standards, it is possible for the UE to signal that it supports a particular band combination. However, improved solutions to allow the best use of all possible configurations are needed.

SUMMARY

According to several embodiments of the systems, methods, and apparatus detailed below, a mobile terminal is configured to provide a base station (e.g., an LTE eNB) with information indicating that while certain band combinations are supported by the mobile terminal for carrier aggregation, the support for one or more of those bands is only with limited performance. In some embodiments, the base station is provided with information indicating how much the performance is reduced is for certain band combinations. Some of these embodiments involve signaling from the mobile terminal. Other embodiments involve solutions implemented solely on the base station side. Each of the several embodiments detailed below may be used individually, but two or more of the embodiments may also be combined with one another.

According to one example method, implemented by a mobile terminal (e.g., a UE, according to 3GPP terminology), a mobile terminal sends a band capability information element to the network (e.g., to a 3GPP eNB). The band capability information element contains data indicating which band combinations the mobile terminal supports for carrier aggregation, e.g., based on 3GPP Release 10. In addition, the mobile terminal sends additional information (e.g., one or more new parameters) associated with at least one specific band combination. In some cases, this new information indicates that a specific band combination has limited support. In these or in other embodiments, the new information contains information about an amount or type of limitation. This latter information may be present on its own, or in combination with the information that more generally indicates that the mobile terminal is capable of only limited support for a specific band combination. Information signaled by the mobile terminal and indicating an amount of limitation may specify a performance limitation (e.g., a desensing amount) relative to a predetermined performance, such as a performance level specified by a standards specification.

In any of these methods, all or part of this new information is provided as one or more optional field(s) in the band capability information element. In some embodiments, the absence of one or more of these field(s) indicates that the mobile terminal has full support (i.e., without limitations) for the band combination(s) associated with this absent field(s).

In some embodiments, in addition to the information that indicates limited support for a specific band combination, the mobile terminal signals the network that the mobile terminal will provide some handling to reduce this limited support. The base station implementation can thus rely on the mobile terminal handling this and may then configure the mobile terminal with a limited-support band-combination without implementing any special handling in the mobile terminal.

Complementary methods are carried out by a network node, such as an LTE eNB. In one such example method, a network node receives a band capability information element sent to the network (e.g., to a 3GPP enNB) by a mobile terminal. The band capability information element contains data indicating which band combinations the mobile terminal supports for carrier aggregation, e.g., based on 3GPP Release 10. In addition, the network node receives additional information (e.g., one or more new parameters) associated with at least one specific band combination. In some cases, this new information indicates that a specific band combination has limited support. In these or in other embodiments, the new information contains information about an amount or type of limitation. This latter information may be present on its own, or in combination with the information that more generally indicates that the mobile terminal is capable of only limited support for a specific band combination. Information signaled by the mobile terminal and indicating an amount of limitation may specify a performance limitation (e.g., a desensing amount) relative to a predetermined performance, such as a performance level specified by a standards specification.

In any of these methods, all or part of this new information is provided as one or more optional field(s) in the band capability information element. In some embodiments, the absence of one or more of these field(s) indicates that the mobile terminal has full support (i.e., without limitations) for the band combination(s) associated with this absent field(s).

In some embodiments, in addition to the information that indicates limited support for a specific band combination, the network node receives signaling from the mobile terminal indicating that the mobile terminal will provide some handling to reduce this limited support. The network node can thus rely on the mobile terminal handling this and may then configure the mobile terminal with a limited-support band-combination without implementing any special handling in the base station.

In another set of approaches, which may be combined with the above techniques in some embodiments, the network node (e.g., an LTE eNB) assumes support of certain non-indicated band combinations. Thus, for example, in some embodiments the mobile terminal will only signal the band combinations that it supports fully, i.e., the band combinations where no combination of resource allocations across the indicated bands cause any desensitization ("desense"). A network node according to some of these embodiments will consider certain band combinations not reported by the mobile terminal, but where all bands can be aggregated in at least one supported configuration and there is at least one configuration with the same Pcell, as "partially supported". The network node can thus proceed to configure the mobile terminal with a band combination that is partially supported, e.g., for carrier aggregation. However, upon making such a configuration the network node can expect that the uplink and/or downlink transmission in one of the configured serving cells may suffer from desensitization.

In still another set of approaches, information in system specifications (e.g., 3GPP specifications) is combined with network node intelligence. More particularly, for example, a network node uses system specifications to learn about limitations when a mobile terminal reports certain band-combinations. For instance, the system specifications can include tables listing maximum desensitization for a particular band-combination. In some embodiments, the specification information is combined with information that is learned by the network node. For example, a base station could test and configure a dual uplink and compare performance with our without a dual uplink. The result can be stored and then used in future configuration (activation/deactivation) or scheduling decisions.

Additional methods in the network, for autonomous identification of mobile terminal capability, may be used instead of or in combination with the above-described techniques. For example, in the event that the mobile terminal capability information (i.e., inter-band capability for problematic bands with potential harmonics problems) is not available in the network, then the network may autonomously attempt to identify whether the mobile terminal is capable of performing inter-band carrier aggregation of component carriers where there exists a potential harmonics problem. For example, a network node (e.g., a serving eNodeB) initiates inter-band carrier aggregation, and then observes the mobile terminal feedback performance, e.g. HARQ ACK/NACK feedback. If the mobile terminal performance is good enough, the network stores the carrier aggregation configuration as possible and keeps the mobile terminal in this configured carrier aggregation state, if needed. This testing may be performed from multiple sites, in some cases, to improve the reliability of the information learned by the network.

Base station and mobile terminal apparatus adapted to carry out the techniques summarized above, and variants thereof, are also disclosed in the detailed discussion that follows. Of course, the techniques, devices, and systems disclosed herein are not limited to the above-summarized features and advantages. Indeed, those skilled in the art will

DETAILED DESCRIPTION

Figure 1:
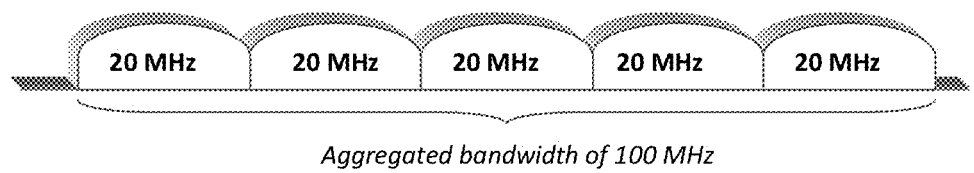
FIGS. 1-4 illustrate several carrier aggregation configurations.
Figure 2:
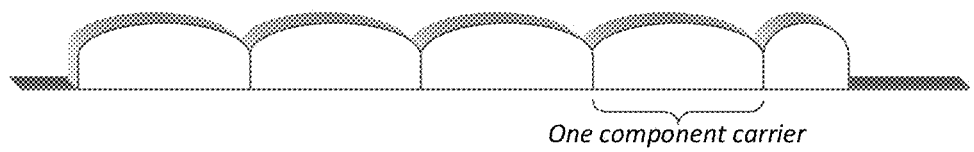
Figure 3:
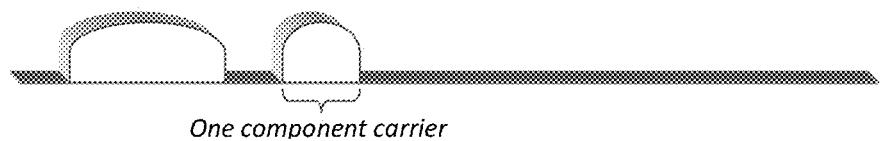
Figure 4:

In the discussion that follows, specific details of particular embodiments of the presently disclosed techniques and apparatus are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

References throughout the specification to "one embodiment" or "an embodiment" mean that a particular feature, structure, or characteristic described in connection with an embodiment is included in at least one embodiment of the techniques, apparatus, or systems described herein. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figures 5, 6:
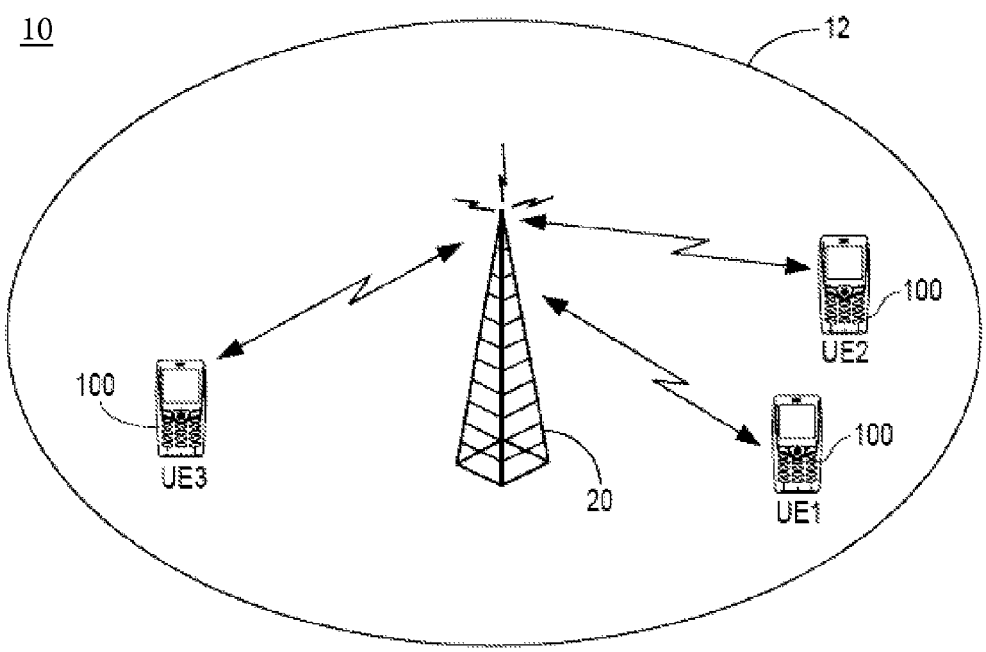
FIG. 5 illustrates an example network in which the present techniques may be employed.
FIG. 6 illustrates a possible implementation of one or more of the solutions described herein in the 3GPP specifications.

FIG. 5 illustrates an exemplary mobile communication network 10 for providing wireless communication services to mobile terminals 100. Three mobile terminals 100, which are referred to as "user equipment" or "UE" in LTE terminology, are shown in FIG. 5. The mobile terminals 100 may comprise, for example, cellular telephones, personal digital assistants, smart phones, laptop computers, handheld computers, or other devices with wireless communication capabilities. It should be noted that the terms "mobile terminal" or "mobile station," as used herein, refer to a terminal operating in a mobile communication network and do not necessarily imply that the terminal itself is mobile or moveable. Thus, the terms may refer to terminals that are installed in fixed configurations, such as in certain machine-to-machine applications, as well as to portable devices, devices installed in motor vehicles, etc.

The mobile communication network 10 comprises a plurality of geographic cell areas or sectors 12. Each geographic cell area or sector 12 is served by a base station 20, which is generally referred to in LTE as an Evolved NodeB (eNodeB). One base station 20 may provide service in multiple geographic cell areas or sectors 12. The mobile terminals 100 receive signals from base station 20 on one or more downlink (DL) channels, and transmit signals to the base station 20 on one or more uplink (UL) channels. As discussed above, some mobile terminals 100 may be capable of receiving and transmitting signals on two or more distinct carriers, according to the carrier aggregation techniques and protocols specified in Release 10 of the specifications for LTE.

For illustrative purposes, several embodiments will be described in the context of context of E-UTRAN, also referred to as LTE. It should be understood that the problems and solutions described herein are equally applicable to wireless access networks and user equipment (UEs) implementing other access technologies and standards. LTE is used as an example technology to which the presently disclosed techniques may be applied, and using LTE in the description therefore is particularly useful for understanding the problem and solutions solving the problem. Those skilled in the art will appreciate, however, that the presently disclosed techniques may be more generally applicable to other wireless communication systems, including, for example, WiMax (IEEE 802.16), WCDMA, UMB, and GSM systems. The use of LTE terminology to describe the various embodiments detailed below should thus not be seen as limiting to this particular technology.

When carrier aggregation is used, some inter-band frequency combinations can be arranged so that harmonics of the mobile terminal's transmit-band (uplink) frequencies from one band fall into the frequency range of a downlink carrier of another band. This means that these harmonics may pass into the receiver for that UE or the receiver of another UE, for example, causing interference to downlink signals. The most problematic harmonic components are usually the odd number harmonics, i.e., three and five times the original transmit frequency used by the mobile terminal, etc., with the third-harmonic component often being the strongest.

A mobile terminal operating with an inter-band combination that has a harmonics problem as described above might suffer receiver desensitization, which will cause reduced receiver sensitivity. For the end user, the impact is that the mobile terminal might lose downlink coverage for an affected band or bands.

The RAN4 working group of 3GPP has classified all new inter-band combinations according to the existence, or not, of a harmonics component causing receiver desensitization. It is worth noting, however, that intermodulation products, e.g., 2×f1−f2, 2×f1−f2, 2×f1+f1, 2×f1+f2 can also cause similar desensing effects for a receiver, even if the specific physical cause might be different than for harmonics. Intermodulation products are sometimes caused by passive components, while harmonics (as well as intermodulation products) are often caused by active components like the amplifier.

With the current 3GPP standards it is possible for a mobile terminal to signal that it supports a certain band combination, but it is not possible to signal that this combination comes with some limitations and/or what these limitations are. More particularly, the specifications produced by the RAN4 working group in 3GPP state that there is a known harmonics issue with the combinations of certain bands. An example of one such band-combination is the combination of Band 4 and Band 17. (Band 4 has uplink and downlink frequencies of 1710-1755 MHz and 2110-2155 MHz, respectively, while Band 17 has uplink and downlink frequencies of 704-716 MHz and 734-746 MHz, respectively.) However, while recognizing that certain band combinations can have problems with harmonics, Release 10 of the 3GPP standards does not provide information on whether some vendors' mobile terminals will experience more desensitization than other mobile terminals and how significant differences in performance may be. The 3GPP standard only specifies minimum requirements for the mobile terminals, and thus does not take into account that some mobile terminals may, by means of implementation or hardware design, experience less of a problem with desensitization from the known harmonics problems than others.

If a mobile terminal reports support only for band combinations for which the mobile terminal indeed has full support, and for which the mobile terminal has no known limitations, then the mobile terminal may not be able to use carrier aggregation at all under some circumstances. This situation may arise, for example, if the PCell for the mobile terminal ends up in the "wrong band". For example, the known problems with the combination of Band 4 and Band 17 exist when the mobile terminal has its PCell in Band 17 and an SCell in Band 4, but not when the PCell is in Band 4 and a downlink-only SCell is in Band 17. If the mobile terminal has indicated support of carrier aggregation when the PCell is in Band 4, but the mobile terminal ends up with a cell in Band 17 during initial access, the base station will not be allowed to configure the mobile terminal with an SCell in Band 4, according to the current 3GPP rules. Hence the mobile terminal will not be able to use carrier aggregation unless it performs a handover to Band 4.

If, on the other hand, the mobile terminal simply reports that it does support carrier aggregation in a band combination where it has limited support or there are known degradations in performance, the base station would need to handle the problem of certain band combinations for mobile terminals by itself. But, since the base station does not know to what extent the mobile terminal itself can handle the harmonics, the base station can only provide the mobile terminal with service based on an assumption that this band combination has an issue with harmonics, but without knowing how significant the desense in the mobile terminal really is. This approach would generally fail to reward good mobile terminal implementations, since all mobile terminals supporting the band combination would likely get identical treatment, e.g., treatment based on a worst case scenario.

Accordingly, several embodiments of the presently disclosed techniques provide the base station with information indicating that while certain band combinations are supported, the support is only with limited performance. In some embodiments, the base station is provided with information indicating how much the performance is reduced is for certain band combinations. Some of the embodiments involve signaling from the mobile terminal, while other embodiments involve solutions solely on the base station side. Each of the several embodiments described in this document may be used individually, but two or more of the embodiments may also be combined with one another.

Solutions Using Mobile Terminal Signaling

In embodiments according to a first approach, a mobile terminal sends a UE Capability Information Element (IE) to the network. (The term "UE Capability IE" is a 3GPP term, referring to a standardized parameter signaled from the mobile terminal to the base station. The term is used in this description because it is widely known to those familiar with the 3GPP specifications. It will be appreciated, of course, that other systems and/or successors to the current 3GPP systems may use different terminology to refer to this or a similar parameter.) The UE Capability IE contains information about which band combinations the mobile terminal supports, e.g., based on 3GPP Release 10. In addition, the mobile terminal sends new information (e.g., one or more new parameters) associated with at least one specific band combination. In some cases, this new information indicates that a specific band combination has limited support. In these or in other embodiments the new information contains information about an amount or type of limitation. This latter information may be present on its own, or in combination with the information that more generally indicates that the mobile terminal is capable of only limited support for a specific band combination.

In any of these embodiments, all or part of this new information can be provided as one or more optional fields in the UE Capability IE. In some embodiments, the absence of one or more of these fields indicates that the mobile terminal has full support (i.e., without limitations) for the band combination or combinations associated with this absent field or fields.

In some embodiments, in addition to the information that indicates limited support for a specific band combination, the mobile terminal informs the base station that the mobile terminal will provide some handling to reduce the impacts of this limited support. The base station implementation can thus rely on the mobile terminal handling this, and may configure the mobile terminal with a limited-support band-combination, without implementing any special handling in the base station. In one embodiment, a report from a mobile terminal indicating full support for a band combination should be interpreted by the base station as indicating that the mobile terminal either has full support for this band-combination or will handle the limited support in a way so that the base station can assume full support.

One possible approach to implementing the above approaches in the 3GPP standards is shown in FIG. 6, where a new parameter ("limitedSupport-r10") is illustrated as a Release 10 parameter, according to the 3GPP TS 36.331 specifications. The new parameter has possible values from 0 . . . 63, where the value of the parameter could, for example, indicate the level of perceived mobile terminal desensitization ("desense") in dB for this specific band combination. Of course, there are many possible ways of implementing the above techniques, whether through modifications to the specifications detailed in 3GPP TS 36.331, or through the use of proprietary signaling, or a combination thereof. Accordingly, the example shown in FIG. 6 should only be considered as one possible example and does not exclude other ways of implementing the present techniques.

In the 3GPP document "Evolved Universal Terrestrial Radio Access (E-UTRA); User Equipment (UE) radio transmission and reception," 3GPP TS 36.101, v. 10.6.0 (March 2012), available at www.3gpp.org, there are tables for receiver (RX) sensitivity listed per band. However, this table is not applicable for carrier aggregation and does not take into account harmonics problems in a carrier aggregation scenario. A table with desensitizing values for carrier aggregation might be developed for Release 11 of the 3GPP specifications, but this table will specify only minimum requirements and will not contain any information for the case when a mobile terminal might perform much better. Hence, for carrier aggregation and certain band combinations, signaling of such information in a carrier aggregation and/or harmonics context can be used. For example, "delta" information, i.e., information indicating a difference in performance compared to existing 3GPP TS 36.101 table values, might be signaled to the network and would be valuable to the base station.

Figure 7:
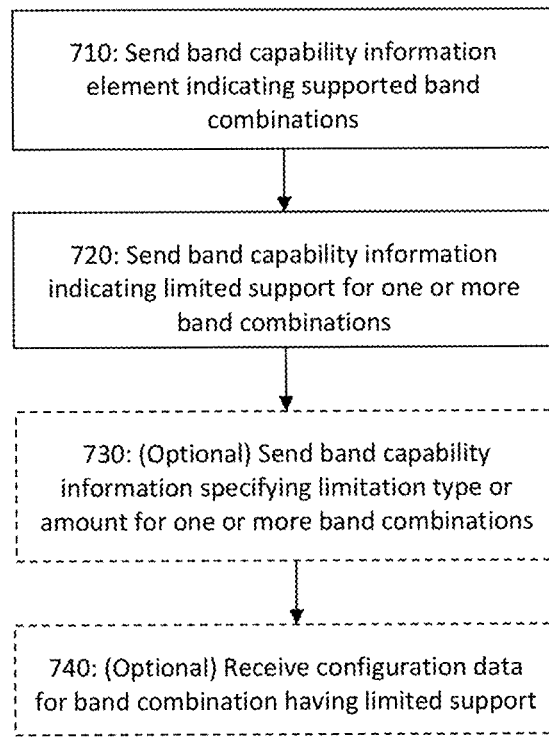
FIG. 7 is a process flow diagram illustrating an example technique as implemented by a mobile terminal.

FIG. 7 illustrates a flow chart for one example method according to the presently disclosed techniques, as might be implemented by a mobile terminal. As shown at block 710, the illustrated process begins with the sending of band capability information indicating support for one or more band combinations. As shown at block 720, the mobile terminal also sends (either separately or as part of the same information element) additional band capability information corresponding to at least one of the supported bands, this additional information indicating limited support for the corresponding band combination.

As shown at block 730, the mobile terminal may also send (either separately or as part of the same information element) information indicating the type or amount of limitation for one or more of the limited support band combinations. This operation is shown as "optional" in FIG. 7, as it may not be applicable to all implementations of the present technique or to all circumstances in which the technique is carried out.

As shown at block 740, the mobile terminal subsequently receives configuration information from the network node for one of the limited supported band combinations. Once again, this operation is shown as optional in FIG. 7, in this case because it may not take place in every circumstance. Depending on the available bands, system conditions, and the band capability information supplied by the mobile terminal, the base station may choose to configure the mobile terminal with a band combination that has no associated limitations.

In some embodiments of the method illustrated in FIG. 7, the additional information discussed above is provided as one or more optional fields in the band capability information element. In various embodiments, this additional information indicates a performance reduction amount, relative to a predetermined performance level, for at least one of the frequency band combinations. In these or in other embodiments, the additional information may indicate a type of limitation for the limited support, for at least one of the frequency band combinations.

Figure 8:
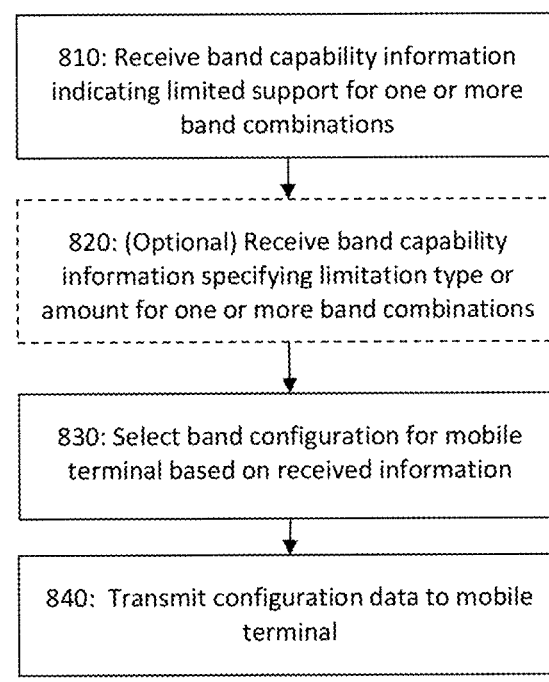
FIG. 8 is a process flow diagram illustrating an example technique as implemented by a network node.

FIG. 8 is a process flow diagram illustrating a complementary method to the method of FIG. 7, as implemented by a network node such as base station. As shown at block 810, the illustrated method begins with receiving band capability information from a mobile terminal, the band capability information indicating limited support by the mobile terminal for at least one frequency band combination, relative to a predetermined level of support. In some embodiments, as shown at block 820, the method includes the receiving of additional information that indicates a type of limitation for the limited support, or an amount of a limitation, or both, for at least one of the frequency band combinations. This additional information may be received as part of the same message or information element that identifies the band combinations having limited support, in some embodiments, or may be received separately, in others. In some embodiments this additional information may not be received at all; for this reason, block 820 is presented as a dashed line, indicating that the illustrated operation is "optional," in that it may not appear in some embodiments or under some circumstances.

As shown at block 830, the illustrated method continues with selecting a band configuration for the mobile terminal, based on the received band capability information. In some embodiments the base station will evaluate the received band capability information in combination with other information to make a decision as to whether or not to configure the mobile terminal to utilize carrier aggregation at all. This other information might include, for example, base station loading in the concerned cell or cells, or configuration limitations specific to the base station, etc. For instance, the base station might be capable of supporting only a particular number of UEs with carrier aggregation; in this case the received band capability for the UEs might be evaluated to determine which UEs should be configured for carrier aggregation, and which not. In some embodiments, the base station may be configured to allow/support band combinations causing desensitization and handle any desensitization issues by implementation, while in others the base station will not support and thus not allow such combinations. The selected band configuration is transmitted to the mobile terminal, as shown at block 840.

In some embodiments of the illustrated method, the limited support is indicated via one or more optional fields in a band capability information element. As suggested above, the band capability information in some embodiments may indicate a performance reduction amount, relative to a predetermined performance level, for at least one of the frequency band combinations. In some of these and in other embodiments, the band capability information may indicate a particular type or types of limitations.

Solution by Base Station Implementation

In another set of approaches, the base station assumes support of certain non-indicated band combinations. Thus, for example, the mobile terminal in some of these embodiments will only signal the band combinations that it supports fully, i.e., the band combinations where no combination of resource allocations across the indicated bands cause any desense or other type of performance degradation. A base station according to some of these embodiments will automatically consider certain band combinations to be "partially supported." More particularly, the base station is configured to identify partially supported band combinations by identifying possible band combinations that were not reported as supported by the mobile terminal, but where all the bands in each combination are aggregated with one or more other bands in at least one configuration that was reported as supported, with a Pcell that matches a Pcell in at least one reported configuration. The base station can thus proceed to configure the mobile terminal with a band combination that is partially supported, e.g., for carrier aggregation. However, upon making such a configuration the base station can expect that the Scell(s) will suffer from desense in case there is a transmission on the uplink.

As an example, consider a scenario where the mobile terminal reports the following supported configurations as part of its capability information:
Configuration 1:
Downlink bands: A+B+C
Uplink bands: A
Configuration 2:
Downlink bands: A
Uplink bands: A
Configuration 3:
Downlink bands: B
Uplink bands: B
Configuration 4:
Downlink bands: D
Uplink bands: D Given the above configuration, a base station according to some embodiments can assume, for example, that the following configuration is also "partially supported," in addition to the reported supported configurations:
Configuration 5:
Downlink bands: A+B+C
Uplink bands: B
However, since the mobile terminal does not support band C as a PCell in any of the reported band combinations, the base station shall not assume that the following configuration is supported:
Configuration 6:
Downlink bands: A+B+C
Uplink bands: C
Also, the base station should not assume support of any configurations involving aggregation of band D in combination with any other band, such as the following:
Configuration 7:
Downlink bands: A+B+C+D
Uplink bands: A
Such a configuration is not supported since the mobile terminal does not report support for aggregation of band D in combination with any other band.

Figure 9:
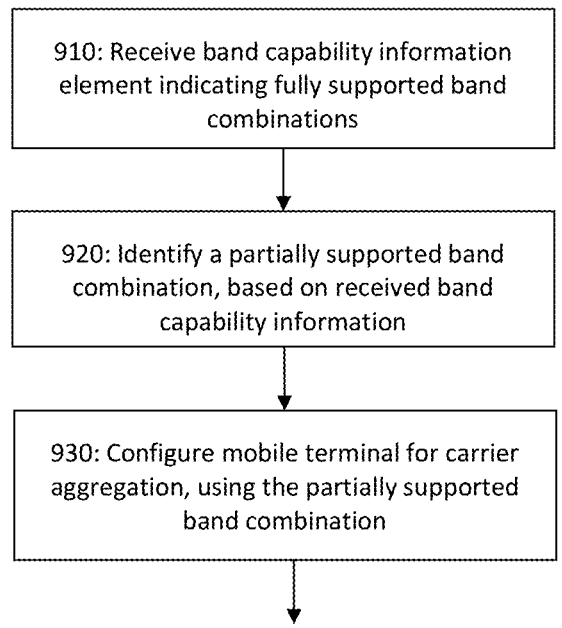
FIG. 9 is a process flow diagram illustrating another example technique as implemented by a network node.

FIG. 9 is a process flow diagram illustrating a generalized method according to technique described above. As shown at block 910, the method begins with receiving a band capability information element sent by the mobile terminal, the band capability information element indicating one or more frequency band combinations that are fully supported by the mobile terminal for carrier aggregation. As shown at block 920, the method continues with the identification of at least one partially supported band combination. As described above, this is done by identifying a possible band combination that was not indicated as fully supported by the mobile terminal, but where all the bands in the possible band combination are aggregated with one or more other bands in at least one frequency band combination that was indicated as supported. The possible band combination also includes a primary cell that matches a primary cell in at least one of the frequency band combinations that was indicated to be fully supported. As shown at block 930, the mobile terminal is then configured for carrier aggregation, using the identified partially supported band combination.

Since a mobile terminal according to current specifications will typically trigger re-establishment upon reception of a configuration for which it has not reported support and/or which it is not expecting to receive, the approaches discussed in this section would likely have an impact on the standards, or would require proprietary agreements between network and mobile terminal vendors. Also note that the example above should only be considered as one possible example of how to derive this understanding in the base station. In another possible example, the example above could be combined with additional rules for or restrictions on how the base station may derive the understanding of partially supported band combinations. Again, these could be proprietary or standardized.

In another set of approaches, information in system specifications may be combined with base station intelligence to determine partially supported band combinations. More particularly, for example, a base station according to these approaches may use information from system specifications to determine the applicable limitations when a mobile terminal reports certain band-combinations. For instance, the specifications can include tables listing maximum receiver desensitization for a particular band-combination. One slight drawback to this approach is that it is not mobile terminal-specific (or even mobile terminal model-specific). Thus, the base station would not know whether a certain mobile terminal or mobile terminal model is good enough to handle the harmonics issue by itself—all mobile terminal vendors would always get same treatment.

The specification information can be combined with information that is learned by the base station, in some embodiments. For example, a base station could test and configure a dual uplink for a given mobile terminal and compare system performance with and without the dual uplink. The result can be stored and then used in future configuration decisions (i.e., activation/deactivation decisions) or scheduling decisions.

Additional methods in the network, for autonomous identification of mobile terminal capability, may be used instead of or in combination with the above-described techniques. For example, in the event that the mobile terminal capability information (i.e., inter-band capability for problematic bands with potential harmonics problems) is not available in the network, then the network may autonomously attempt to identify whether the mobile terminal is capable of performing inter-band carrier aggregation of component carriers where there exists a potential harmonics problem. An example of this approach is illustrated in the process flow diagram of FIG. 10. In this example, the network (e.g., a serving eNode B) initiates inter-band carrier aggregation, and then observes the mobile terminal feedback performance, e.g., HARQ ACK/NACK—performance #1. In other words, the network configures the mobile terminal for carrier aggregation with a frequency band combination, as shown at block 1010, and then observes feedback performance for the mobile terminal, as shown at block 1020, while the mobile terminal operates in that configuration. In the event that the performance #1 is good enough, the base station stores the carrier aggregation configuration as possible and keeps the mobile terminal in this configured carrier aggregation state, if needed. Thus, the network determines that the feedback performance meets a predetermined level, as shown at block 1030, and identifies and stores the frequency band combination as a possible frequency band combination for the mobile terminal, as shown at block 1040. This testing may be performed from multiple sites, in some cases, to improve the reliability of the information learned by the network.

The network node may also have a priori information of the HARQ ACK/NACK performance when the intra-band aggregated component carriers have been configured in a certain way before—e.g., information as to performance #0 in radio conditions similar to those used for observing performance #1. If the difference between performances #0 and #1 is within a predetermined threshold then the network may assume that a mobile terminal is capable of performing inter-band carrier aggregation with a certain uplink configuration. The network node can store this detected/identified mobile terminal capability information for this mobile terminal and use this for performing inter-band carrier aggregation from a different site, whenever needed. The network node may also signal this identified mobile terminal capability to other network nodes such as to another eNode B, a core network (e.g., for various purposes like HO, O&M, SON, network management, etc.).

The above-described techniques can provide several advantages. First, the base station will be able to configure carrier aggregation for band-combinations which have some limitations, as compared to not being able to configure carrier aggregation at all for those band combinations. Alternatively, the base station will be able to derive from signaled information which band combinations are partially supported. This will make the carrier aggregation feature more useful, since base station will be able to be informed of and make use, as needed, of band-combinations having some kind of degraded support. This means that more mobile terminals will be able to be configured with carrier aggregation, since these mobile terminals will not be as dependent on "luck" (i.e., on which PCell it gets at initial access) to get configured with carrier aggregation, and are more likely to be configured for carrier aggregation, even if only with partial support for some bands.

Some mobile terminal implementations may be able to handle certain harmonics issues, e.g., by the use of certain hardware or specialized implementations. With the techniques described herein, these mobile terminals would benefit from the base stations' knowledge of this and would thus not receive unnecessary scheduling reductions that might be implemented were all mobile terminals assumed to have equally good or bad performance with respect to certain band combinations.

Some embodiments could also be used for providing the base station with information about other limitations than harmonic for certain band combinations or other mobile terminal specific capabilities.

Figure 10:
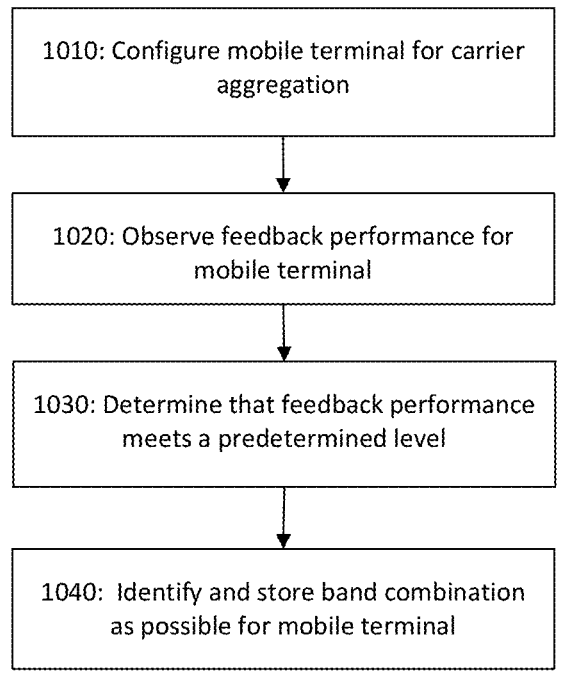
FIG. 10 is a process flow diagram illustrating still another example technique as implemented by a network node.

Several of the techniques described above, including those discussed in connection with FIGS. 8, 9, and 10, can be implemented in connection with a wireless base station, such as an eNodeB configured according to Release 11 specifications for LTE. In general, a base station communicates with access terminals and is referred to in various contexts as an access point, Node B, Evolved Node B (eNodeB or eNB) or some other terminology. Although the various base stations discussed herein are generally described and illustrated as though each base station is a single physical entity, those skilled in the art will recognize that various physical configurations are possible, including those in which the functional aspects discussed here are split between two physically separated units. Thus, the term "base station" is used herein to refer to a collection of functional elements (one of which is a radio transceiver that communicates wirelessly with one or more mobile terminals), which may or may not be implemented as a single physical unit. Likewise, several of the techniques described above, including those discussed in connection with FIG. 7, can be implemented in connection with a mobile terminal, such as a user equipment (UE) configured according to Release 11 specifications.

Figure 11:
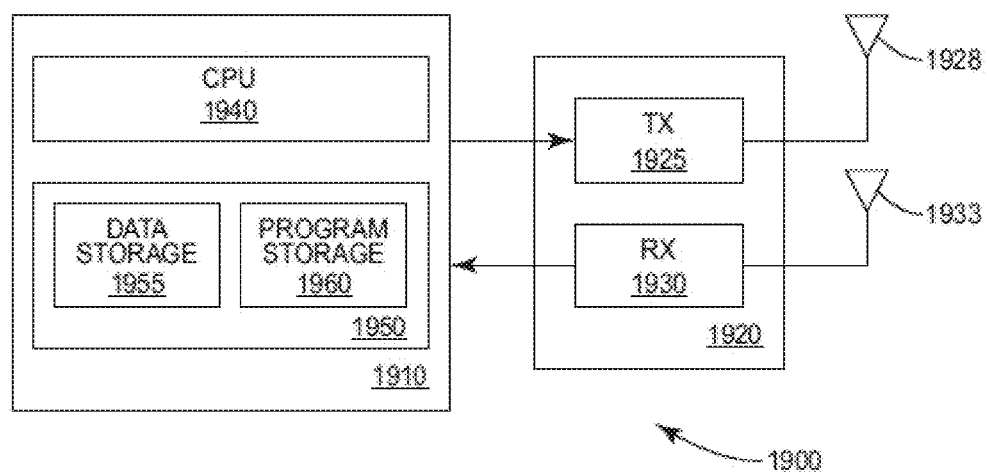
FIG. 11 is a block diagram illustrating some components of an example communication node according to several embodiments.

FIG. 11 illustrates features of an example communications node 1900 according to several embodiments of the techniques described herein. Although the detailed configuration, as well as features such as physical size, power requirements, etc., will vary, the general characteristics of the elements of communications node 1900 are common to both a wireless base station and a mobile terminal. Either may be adapted to carry out one or several of the techniques described above for facilitating the improved assignment of bands for carrier aggregation.

Communications node 1900 comprises a transceiver 19200 for communicating with user terminals (in the case of a base station) or with one or more base stations (in the case of a user terminal) as well as a processing circuit 1910 for processing the signals transmitted and received by the transceiver 1920. Transceiver 1920 includes a transmitter 1925 coupled to one or more transmit antennas 1928 and receiver 1930 coupled to one or more receive antennas 1933. The same antenna(s) 1928 and 1933 may be used for both transmission and reception. Receiver 1930 and transmitter 1925 use known radio processing and signal processing components and techniques, typically according to a particular telecommunications standard such as the 3GPP standards for LTE and/or LTE-Advanced. Because the various details and engineering tradeoffs associated with the design and implementation of such circuitry are well known and are unnecessary to a full understanding of the techniques described herein, additional details are not shown here.

Processing circuit 1910 comprises one or more processors 1940, hardware, firmware or a combination thereof, coupled to one or more memory devices 1950 that make up a data storage memory 1955 and a program storage memory 1960. Memory 1950 may comprise one or several types of memory such as read-only memory (ROM), random-access memory, cache memory, flash memory devices, optical storage devices, etc. Again, because the various details and engineering tradeoffs associated with the design of baseband processing circuitry for mobile devices and wireless base stations are well known and are unnecessary to a full understanding of the techniques described herein, additional details are not shown here.

Typical functions of the processing circuit 1910 include modulation and coding of transmitted signals and the demodulation and decoding of received signals. In several embodiments of the present techniques, processing circuit 1910 is adapted, using suitable program code stored in program storage memory 1960, for example, to carry out one of the techniques described above for signaling enhanced band capability information to the network (in the case of a mobile terminal) or for receiving and/or deducing band capabilities (in the case of a base station). Of course, it will be appreciated that not all of the steps of these techniques are necessarily performed in a single microprocessor or even in a single module.

Not shown in FIG. 11, but included in several embodiments, is a network interface circuit configured for communication with other nodes in the wireless network. In LTE eNodeBs, in particular, this network interface circuit is configured to communicate with other eNodeB's using the X2 interface defined by 3GPP specifications, as well as with one or more Mobility Management Entities (MMEs) using 3GPP's S1 interface. Band capability information for mobile terminals, for example, may be requested and received via this network interface circuit.

Examples of several embodiments have been described in detail above, with reference to the attached illustrations of specific embodiments. Because it is not possible, of course, to describe every conceivable combination of components or techniques, those skilled in the art will appreciate that the presently disclosed techniques can be implemented in other ways than those specifically set forth herein, without departing from essential characteristics of the techniques. Modifications and other embodiments will come to mind to one skilled in the art having the benefit of the teachings presented in the foregoing description and the associated drawings. Therefore, it is to be understood that modifications and other embodiments are intended to be included within the scope of this disclosure. Although specific terms may be employed herein, they are used in a generic and descriptive sense only and not for purposes of limitation. The present embodiments are thus to be considered in all respects as illustrative and not restrictive.

What is claimed is:

1. A method, in a mobile terminal, for signaling capability information in a wireless communication network, the method comprising:
    sending a band capability information element to a network node in the wireless communication network, the band capability information element indicating one or more frequency band combinations supported by the mobile terminal for carrier aggregation; and
    sending additional information corresponding to at least one of the frequency band combinations, the additional information indicating limited support for the at least one frequency band combination, relative to a predetermined level of support, wherein the additional information is provided as one or more optional fields in the band capability information element.

2. A method, in a network node of a wireless communication network, the method comprising:
    receiving band capability information from a mobile terminal, the band capability information indicating one or more frequency band combinations supported by the mobile terminal for carrier aggregation;
    receiving additional band capability information from the mobile terminal, the additional band capability information indicating limited support by the mobile terminal for at least one of the frequency band combinations indicated as being supported by the mobile terminal for carrier aggregation, relative to a predetermined level of support, wherein the limited support is indicated via one or more optional fields in a band capability information element;
    selecting a band configuration for the mobile terminal, based on the received additional band capability information; and transmitting band configuration data to the mobile terminal.

3. A mobile terminal, comprising:
    transceiver circuitry adapted for communicating with a base station in a wireless communication network; and
    one or more processing circuits operable to control the transceiver circuitry and adapted to send a band capability information element to a network node in the wireless communication network, the band capability information element indicating one or more frequency band combinations supported by the mobile terminal for carrier aggregation, and
    send additional information corresponding to at least one of the frequency band combinations, the additional information indicating limited support for the at least one frequency band combination, relative to a predetermined level of support, wherein the additional information is provided in one or more optional fields in the band capability information element.

4. A base station adapted for use in a wireless communication network, the base station comprising:
    transceiver circuitry adapted to communicate with one or more mobile terminals; and
    one or more processing circuits adapted to control the transceiver circuitry and to;
    receive band capability information from a mobile terminal, the band capability information indicating one or more frequency band combinations supported by the mobile terminal for carrier aggregation;
    receive additional band capability information from the mobile terminal, the additional band capability information indicating limited support by the mobile terminal for at least one of the frequency band combinations indicated as being supported by the mobile terminal for carrier aggregation, relative to a predetermined level of support, wherein the limited support is indicated via one or more optional fields in a band capability information element,
    select a band configuration for the mobile terminal, based on the received additional band capability information, and
    transmit band configuration data to the mobile terminal.

5. A method, in a wireless network node, for determining band capability information for a mobile terminal in a wireless communication network, the method comprising:
    receiving a band capability information element sent by the mobile terminal, the band capability information element indicating one or more frequency band combinations that are fully supported by the mobile terminal for carrier aggregation;
    identifying a partially supported band combination by identifying a possible band combination that was not indicated as fully supported by the mobile terminal, but where all the bands in the possible band combination are aggregated with one or more other bands in at least one frequency band combination that was indicated as supported, the possible band combination including a primary cell that matches a primary cell in at least one of the frequency band combinations that was indicated to be fully supported; and
    configuring the mobile terminal for carrier aggregation using the identified partially supported band combination.

* * * * *